No. 788,019.   Patented April 25, 1905.

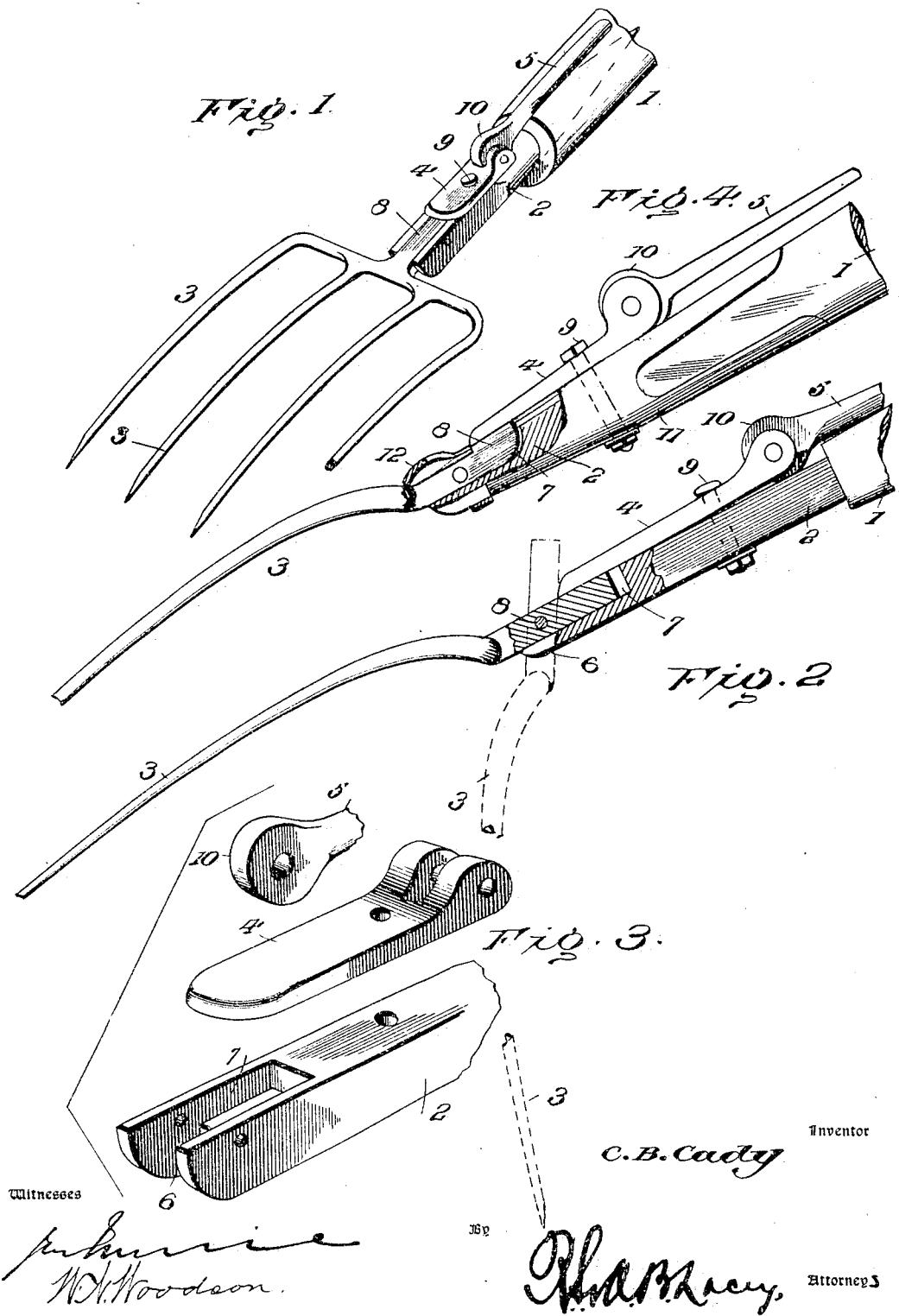

UNITED STATES PATENT OFFICE.

CHARLIE B. CADY, OF SHENNINGTON, WISCONSIN.

HAY FORK AND HOOK.

SPECIFICATION forming part of Letters Patent No. 788,019, dated April 25, 1905.

Application filed June 29, 1904. Serial No. 214,684.

*To all whom it may concern:*

Be it known that I, CHARLIE B. CADY, a citizen of the United States, residing at Shennington, in the county of Monroe and State of Wisconsin, have invented certain new and useful Improvements in Hay Forks and Hooks, of which the following is a specification.

This invention has relation to implements of the pitchfork type, the purpose being to provide an article of this class which may be readily converted so as to be used either as a fork or a hook, as may be required for the performance of the particular work in hand.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of an implement embodying the invention. Fig. 2 is a side elevation showing the parts on a larger scale, a portion of the handle and stem being broken away and the extreme portions of the tool being shown by full and dotted lines. Fig. 3 is a perspective view of the stem, lockplate, and lock-lever separated and arranged in a group. Fig. 4 is a view similar to Fig. 2 of a modification.

Corresponding and like parts are referred to in the following description and indicated in all the views of the drawings by the same reference characters.

The implement comprises the handle 1, stem 2, tool 3, lock-plate 4, and lock-lever 5. The stem 2 may be fastened to the handle 1 in any manner or may constitute a part thereof. The outer end of the stem is bifurcated, as shown at 6, and is notched in one side adjacent to the bifurcation, as indicated at 7, to receive the inner end of the shank 8 of the tool. The tool may be of any construction to which the invention is applicable, and, as shown, consists of a fork, the shank 8 being pivoted between the bifurcations of the stem 2. As shown in Fig. 1 and by the full lines in Fig. 2, the tool may be arranged in longitudinal alinement with the stem and handle, and when required it may be turned at an angle to the stem and handle, as indicated by the dotted lines in Fig. 2, in which position the tool may be used as a hook or drag.

The lock-plate 4 is secured to the stem 2 by a single fastening 9, which may be a bolt or machine-screw, and upon which the lock-plate is adapted to turn. One end of the lock-plate is forked, and the cam-head 10 of the lock-lever 5 is received between the fork members and pivoted thereto. When the lock-lever is turned down upon the stem or handle, the lock-plate is secured, and when said lock-lever is moved upward at its free end the lockplate is released and may be turned upon the fastening 9, so as to clear the inner end of the shank 8 and permit the tool 3 to be turned so as either to aline with the stem and handle or sit at an angle thereto as required. When the tool 3 is in longitudinal alinement with the stem and handle, the inner end of the shank 8 enters the notch 7 and is held therein by the outer end of the lock-plate 4. When the tool is turned at an angle to the stem and handle, as indicated by the dotted lines in Fig. 2, the outer end of the lock-plate fits into the angle formed between the shaft 8 and stem 2, thereby fixing the position of said tool. In this adjustment of the tool a portion of the shank 8 engages with the wall between the bifurcations, which limits its movement in one direction, and another portion of the shank is engaged by the lock-plate 4, which limits the movement of the tool in the opposite direction. The outer end of the lock-plate is beveled and made slightly rounding, so as to move freely when swinging it upon the fastening 9 either to engage with the shank 8 or to clear the same.

In the modification shown in Fig. 4 the stem 2 is let into the handle 1 so as to bring the head of the fork near the extremity of the handle. A ferrule 11 is fitted to the end of the handle 1 to strengthen the same, and the head of the lock-lever enters a recess in a side of said ferrule when the parts are locked. A reinforcement 12 is applied to the outer end of the ferrule 11, and the shank 8 of the fork operates in slots formed therein at diagonally opposite points. In all other particulars the construction and operation are substantially the same as herein disclosed.

Having thus described the invention, what is claimed as new is—

1. In an implement of the character described, the combination of a stem, a tool pivotally connected to the stem and adapted to be turned to any adjusted position, a lock-plate pivotally connected to the stem and adapted to be turned either to clear or to engage with the shank of the tool, and a lock-lever pivotally connected to the lock-plate and adapted to exert a pressure against said stem to secure the lock-plate when in engagement with the shank of the tool, substantially as set forth.

2. In a tool of the character described, the combination of a stem having one end bifurcated and a notch in one side in communication with the bifurcation, a tool having its shank pivoted between the bifurcations and adapted to enter said notch, a lock-plate pivoted to the stem and adapted to extend over the notch to hold the shank of the tool therein or to come in the rear of said shank when the tool is turned at an angle to the stem, and means coöperating with the lock-plate for securing it in operative position, substantially as set forth.

In testimony whereof I affix my signature in presence of two witnesses.

CHARLIE B. CADY. [L. S.]

Witnesses:
 A. B. LARSEN,
 E. L. CRANFORD.